J. F. O'CONNOR.
FRICTION SPRING DRAFT RIGGING.
APPLICATION FILED OCT. 1, 1909.

953,055.

Patented Mar. 29, 1910.
3 SHEETS—SHEET 1.

WITNESSES:
F. B. Townsend
Pearl Abrams

INVENTOR
John F. O'Connor
BY
Munday, Evarts, Adcock & Clarke,
his ATTORNEYS

J. F. O'CONNOR.
FRICTION SPRING DRAFT RIGGING.
APPLICATION FILED OCT. 1, 1909.
953,055.
Patented Mar. 29, 1910.
3 SHEETS—SHEET 2.
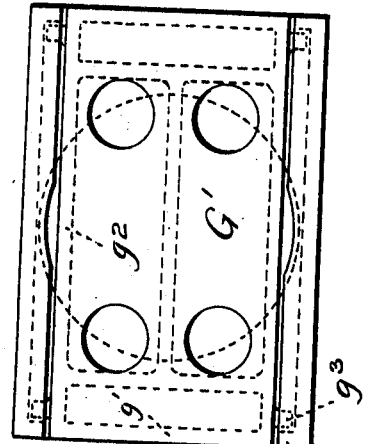
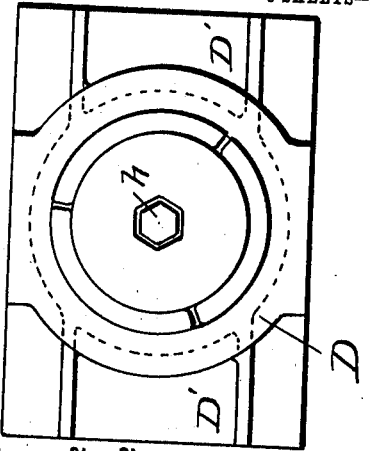
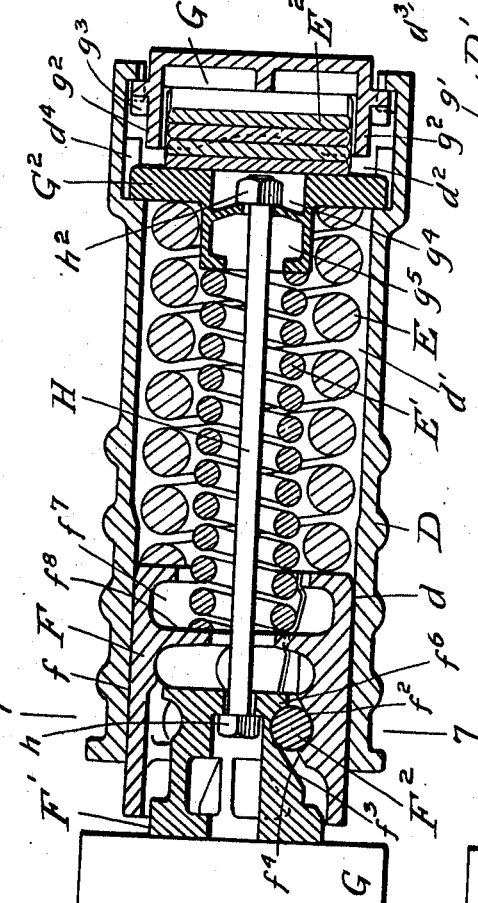
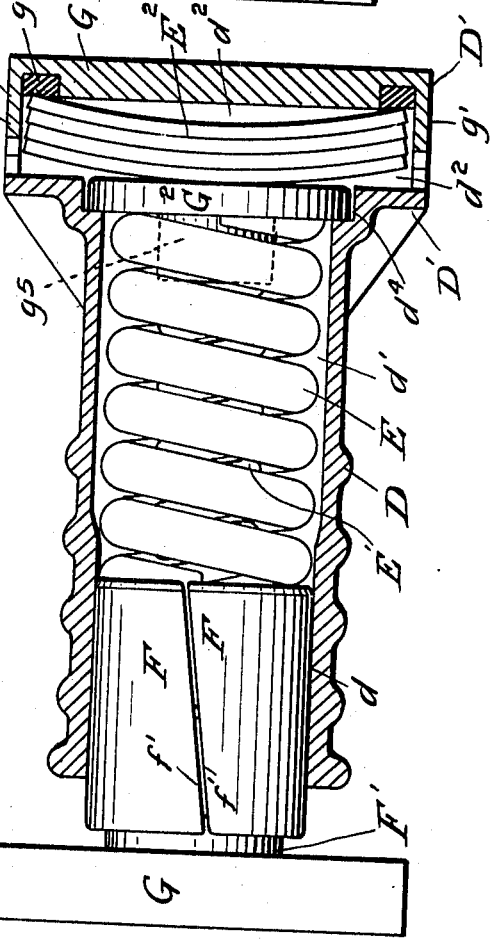
WITNESSES:
F. B. Townsend
Pearl Abrams
INVENTOR
John F. O'Connor
BY
Munday, Evarts, Adcock & Clarke
his ATTORNEYS

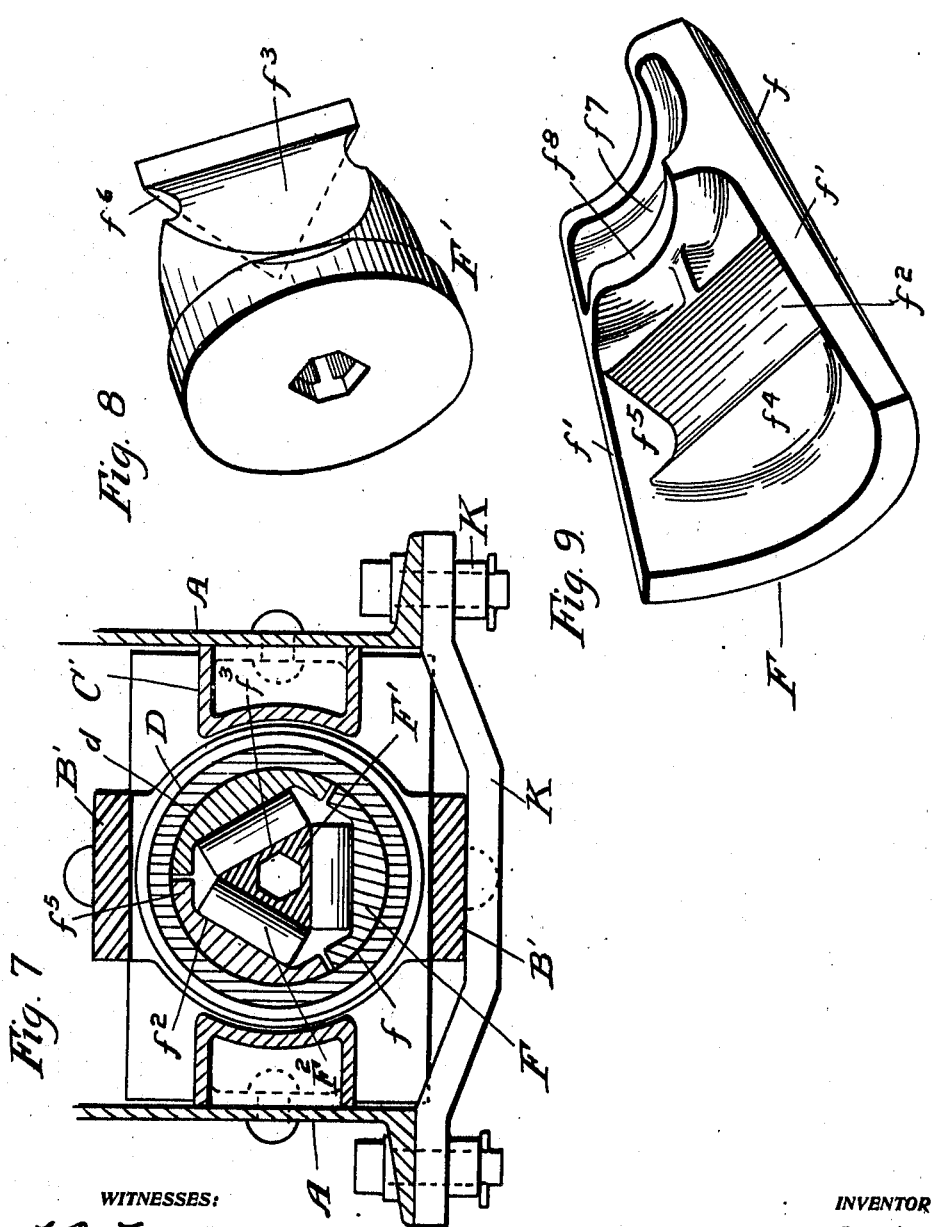

UNITED STATES PATENT OFFICE.

JOHN F. O'CONNOR, OF CHICAGO, ILLINOIS, ASSIGNOR, BY MESNE ASSIGNMENTS, TO WILLIAM H. MINER, OF CHICAGO, ILLINOIS.

FRICTION SPRING DRAFT-RIGGING.

953,055.  Specification of Letters Patent.  Patented Mar. 29, 1910.

Application filed October 1, 1909. Serial No. 520,553.

*To all whom it may concern:*

Be it known that I, JOHN F. O'CONNOR, a citizen of the United States, residing in Chicago, in the county of Cook and State of Illinois, have invented a new and useful Improvement in Friction Spring Draft-Rigging, of which the following is a specification.

My invention relates to improvements in friction draft rigging.

The object of my invention is to provide a friction draft rigging which will be compact in form, composed of few parts, have a high spring cushioning capacity and a high friction cushioning capacity, and which will be strong and durable and efficient and reliable in operation in cushioning and in releasing.

My invention consists in the means I employ to practically accomplish this object or result, the same being herein shown and described and more particularly specified in the claims.

Figure 1:
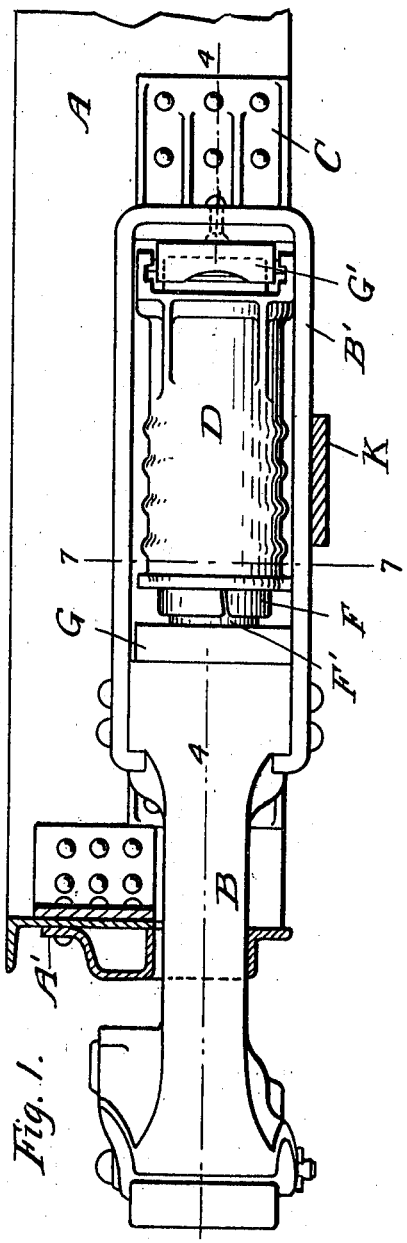
Figure 2:
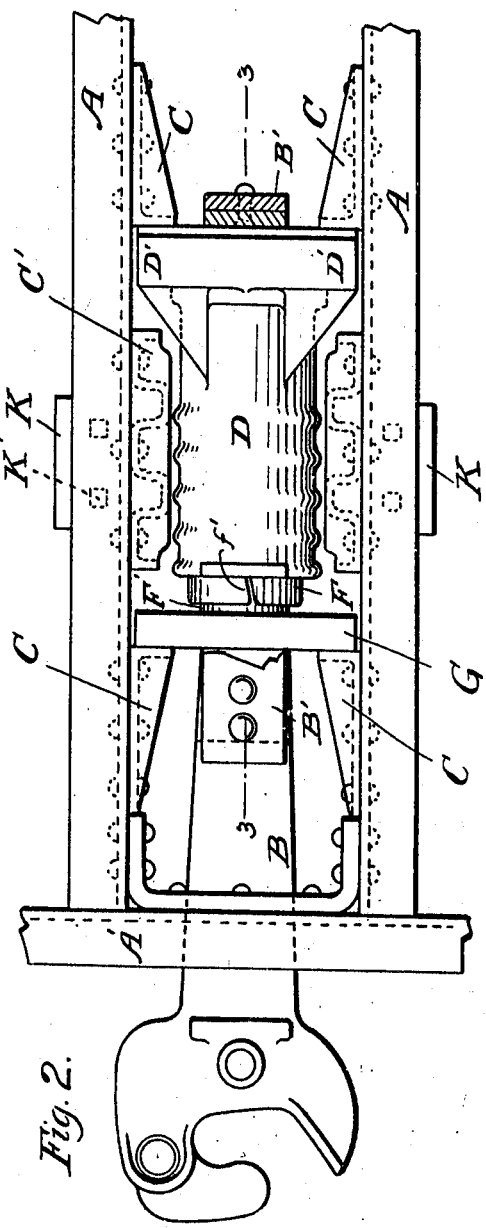

In the accompanying drawing forming a part of this specification, Figure 1 is a side elevation, partly in vertical section, of a friction spring draft rigging embodying my invention. Fig. 2 is a plan view. Fig. 3 is a detail vertical section on line 3—3 of Fig. 2. Fig. 4 is a detail horizontal section on line 4—4 of Fig. 1 showing the friction mechanism in elevation. Fig. 5 is a rear end view of the friction case or cylinder and contained parts, as shown in Fig. 3. Fig. 6 is a front end view of the friction case and contained parts. Fig. 7 is a vertical cross section on line 7—7 of Fig. 1. Fig. 8 is a detail perspective view of the wedge and Fig. 9 is a detail perspective view of one of the friction shoes.

In the drawing, A represents the center sills or frame members of the car to which the draft rigging is applied. $A^1$ the front or end sill, B the draw-bar, $B^1$ the draft yoke secured thereto and C the draft lugs or stops against which the followers abut, and $C^1$ intermediate stops to limit the movement of the followers and cushioning devices.

D is a longitudinally movable friction shell or case having an internal friction face $d$, preferably cylindric in cross section, and having a cylindrical chamber $d^1$ at the rear of its friction face $d$ to receive coil springs E $E^1$, and a rectangular chamber $d^2$ at its rear end to receive a series of flat rectangular plate springs $E^2$, the chamber $d^2$ being formed by integral lateral extensions or wings $D^1$ on the friction shell D.

F F are longitudinally movable segmental friction shoes, preferably three in number, each having an external friction face $f$ in sliding frictional engagement with the internal friction face $d$ of the friction shell D. The friction shoes F preferably have oblique meeting edges $f^1$ to insure evenness of wear.

$F^1$ is a wedge acting against the friction shoes, the same being preferably three faced or pyramidal in shape, its faces corresponding to the number of the friction shoes.

The friction shoes F each have an inner wedging face $f^2$ coacting with a corresponding wedging face $f^3$ of the wedge $F^1$ through the anti-friction rollers $F^2$ which are interposed between the wedge and friction shoes. The friction shoes F have stop shoulders $f^4$ to keep the rollers in position, and also end shoulders $f^5$ to keep the rollers from slipping lengthwise, and the wedge $F^1$ also has stop shoulders $f^6$ to aid in keeping the rollers in position. The front follower G is interposed between the wedge F and the draw-bar. A rear follower $G^1$ is interposed between the series of curved plate springs $E^2$ and the draft yoke $B^1$, the rear follower $G^1$ preferably having hardened steel wearing blocks $g$ for the ends of the adjacent one of the curved plate springs $E^2$ to bear against and rub. The rear follower $G^1$ is also furnished at its ends with flanges $g^1$ inclosing the ends of the curved plate or leaf springs $E^2$, and with upper and lower flanges $g^2$ inclosing or housing the upper and lower edges of the curved plate springs $E^2$, the follower $G^1$ being thus box shaped to partially inclose the plate springs $E^2$. The rear follower $G^1$ fits or telescopes within the rear rectangular end of the friction case or shell D, and it is provided with lugs $g^3$ which fit within and engage coöperating flanges $d^3$ at the rear end of the friction shell D to retain the follower $G^1$ in assembled position with the friction shell and other parts. A supplemental follower $G^2$ is interposed between the curved plate springs $E^2$ and the rear ends of the coiled springs E $E^1$. This supplemental follower is connected by a connecting rod H with the wedge $F^1$, the connecting rod having a head $h$ at one end and a threaded nut $h^1$ at its other end, fitting in a recess $g^4$ in the supplemental follower $G^2$. The supplemental follower $G^2$ is also furnished with a projecting boss $g^5$ for the small coiled spring $E^1$ to bear against, and to serve as a guide to hold the large coiled spring E in position. The friction shoes F have a recess $f^7$ at their rear end to receive the front end of the small coiled spring $E^1$, and a shoulder $f^8$ for the front end of the small coiled spring to bear against.

K represents a removable tie or guide plate which supports the draft rigging in position between the draft sills A A, the tie plate being secured to the sills by bolts $K^1$.

The plate springs $E^2$ are made of comparatively thick spring plate steel and are preferably of about twice the capacity of the two coiled springs E $E^1$. As the supplemental follower $G^2$ is interposed directly between the plate springs $E^2$ and the coiled springs E $E^1$, all the springs operate in conjunction in starting the release action after the cushioning devices have been compressed by a heavy blow of the draw-bar, thus insuring a positive and certain release action, however great may be the total cushioning capacity of the draft rigging. The friction shell D is provided with a shouldered recess $d^4$ to receive the supplemental follower $G^2$, the same limiting the motion of said follower in the forward direction only or toward the friction shoes. As the weaker springs E $E^1$ only act against the friction shoes, being interposed between the friction shoes and the high capacity springs $E^2$, the cushioning action of the friction shoes is normally restricted or limited to that produced by the resisting action of the weaker springs $E^1$ on the friction shoes. This renders the draft rigging as a whole comparatively sensitive and very efficient in cushioning action under extremely heavy blows after the coiled springs E $E^1$ are compressed substantially solid. The heavy plate springs $E^2$ then further act to further increase the frictional cushioning action of the friction shoes and friction shell, this action being produced by reason of the fact that the total compressive movement of the plate springs $E^2$ is greater than the normal projection of the main follower $G^1$ beyond the rear end of the friction shell B, as will be readily understood from Fig. 3 of the drawing.

I claim:—

1. In a friction spring draft rigging, the combination with friction shoes, of a friction shell having a rectangular extension at one end to receive plate springs, a coiled spring bearing against the friction shoes, plate springs in said rectangular extension of the friction shell, and a supplemental follower interposed between the coiled spring and the plate springs, substantially as specified.

2. In a friction spring draft rigging, the combination with a friction shell, of friction shoes within the shell, a wedge, a coiled spring acting against the friction shoes, a series of plate springs at the opposite end of the coiled spring, a supplemental follower interposed between the plate springs and the coiled spring, and a connection between the wedge and said supplemental follower, substantially as specified.

3. In a friction spring draft rigging, the combination with a friction shell, of friction shoes within the shell, a wedge, a coiled spring acting against the friction shoes, a series of plate springs at the opposite end of the coiled spring, a supplemental follower interposed between the plate springs and the coiled spring, a connection between the wedge and said supplemental follower, a main follower bearing against the plate springs, said main follower and said friction shell having interengaging shoulders to hold the main follower and plate springs in assembled position within the friction shell, substantially as specified.

4. In a friction draft rigging, the combination with a friction shell having a rectangular extension at one end to receive plate springs, of friction shoes within the shell, a coiled spring within the shell, and plate springs within said rectangular extension of the friction shell, substantially as specified.

5. In a friction draft rigging, the combination with a friction shell having a rectangular extension at one end to receive plate springs, of friction shoes within the shell, a coiled spring within the shell, plate springs within said rectangular extension of the friction shell, a main follower bearing against said plate springs, and a supplemental follower between the coiled spring and plate springs, substantially as specified.

JOHN F. O'CONNOR.

Witnesses:
EDMUND ADCOCK,
PEARL ABRAMS.